US012302069B2

(12) United States Patent
Kocher et al.

(10) Patent No.: US 12,302,069 B2
(45) Date of Patent: May 13, 2025

(54) HEARING AID INCLUDING A PIEZO ASSEMBLY AND AN ELECTROMAGNETIC ASSEMBLY

(71) Applicant: Oticon Medical A/S, Smørum (DK)

(72) Inventors: Johannes Kocher, Askim (SE); Erik Holgersson, Askim (SE)

(73) Assignee: OTICON MEDICAL A/S, Smørum (DK)

( * ) Notice: Subject to any disclaimer, the term of this patent is extended or adjusted under 35 U.S.C. 154(b) by 135 days.

(21) Appl. No.: 18/075,994

(22) Filed: Dec. 6, 2022

(65) Prior Publication Data

US 2023/0179932 A1 Jun. 8, 2023

(30) Foreign Application Priority Data

Dec. 7, 2021 (EP) .................................... 21212676

(51) Int. Cl.

*H04R 25/00* (2006.01)
*B06B 1/02* (2006.01)
*B06B 1/06* (2006.01)

(52) U.S. Cl.

CPC ......... *H04R 25/606* (2013.01); *B06B 1/0207* (2013.01); *B06B 1/0644* (2013.01)

(58) Field of Classification Search

CPC ...... H04R 25/00; H04R 25/60; H04R 25/604; H04R 25/606

See application file for complete search history.

(56) References Cited

U.S. PATENT DOCUMENTS 4,904,233 A * 2/1990 Håkansson .......... H04R 25/606 600/25
6,123,660 A 9/2000 Leysieffer
(Continued)

FOREIGN PATENT DOCUMENTS

JP 48-34689 A 5/1973
WO WO2020/133352 A1 7/2020

*Primary Examiner* — Suhan Ni

(74) *Attorney, Agent, or Firm* — Birch, Stewart, Kolasch & Birch, LLP

(57) ABSTRACT

According to an aspect of the present disclosure, a hearing aid is disclosed. The hearing aid including a vibrator configured to apply a main vibration stimulation onto a skull of a recipient of the hearing aid. The vibrator may include a first assembly which comprises a magnet configured to provide a static magnetic flux and a coil configured to provide a dynamic magnetic flux based on a first current, and the coil may be wrapped around at least a part of the magnet. Furthermore, the vibrator includes a second assembly which includes a vibrator transfer unit and a suspension spring, and wherein the first assembly may be configured to move relative to the second assembly generating a first vibration based on the static and the dynamic magnetic flux, and the first vibration may be transferred to the vibrator transfer unit. Additionally, the vibrator includes a first piezo assembly configured to move based on a second current generating a second vibration, and wherein the first piezo assembly may be connected to the vibrator transfer unit, and when the first piezo assembly moves, a second vibration may be generated, and the second vibration may be transferred to the vibrator transfer unit. The main vibration which is transferred to a skull of the recipient via the vibrator transfer unit may include the first vibration and/or the second vibration.

19 Claims, 6 Drawing Sheets

(56) References Cited

U.S. PATENT DOCUMENTS

| | | | | |
|---|---|---|---|---|
| 2001/0033669 | A1 | 10/2001 | Bank et al. | |
| 2004/0116772 | A1* | 6/2004 | Lupin | H04R 25/606 600/25 |
| 2006/0015155 | A1* | 1/2006 | Charvin | H04R 25/606 607/57 |
| 2007/0053536 | A1* | 3/2007 | Westerkull | H04R 25/606 381/326 |
| 2015/0117684 | A1 | 4/2015 | Fukami et al. | |
| 2016/0112812 | A1 | 4/2016 | Vermeiren | |
| 2019/0349695 | A1 | 11/2019 | Bern | |

* cited by examiner

HEARING AID INCLUDING A PIEZO ASSEMBLY AND AN ELECTROMAGNETIC ASSEMBLY

FIELD OF THE DISCLOSURE

The present disclosure relates to a hearing aid including a vibrator. More precisely, the hearing aid includes a vibrator which combines piezo and electromagnetic generated vibrations for improving the hearing capability of a recipient of the hearing aid.

BACKGROUND

Medical implants such as bone anchored hearing aid systems are applied for the rehabilitation of patients suffering from hearing losses for which traditional hearing aids are insufficient. A typical bone anchored hearing aid system comprises an external hearing aid provided with a vibrator connected to a skin-penetrating abutment through a coupling. An alternative bone anchored hearing aid system comprises an external part and an implant in which the vibrator is arranged. A common vibrator is an electromagnetic transducer which has a rather narrow resonance peak, where efficiency and sound output is highest. This resonance peak is normally designed to be around 1000 Hz, and this results in limited maximal sound transfer at low frequencies below 600 Hz and very high frequencies above 3000 Hz. The human brain needs to process vibration and sound between 500 Hz and 8000 Hz to process speech in a good way. A vibrator for a hearing aid having a wider frequency range is therefore desired. When using a vibrator having one vibrator source for generating vibration, i.e. sound excitation, usually one resonance peak can be achieved through the design of the source, however, if multiple vibrator sources are used multiple resonance peaks can be generated, resulting in a wider frequency range with high output and high power efficiency. Due to the size constraints of a hearing aid, it is rather difficult to arrange multiple vibrator sources within a vibrator which must fit into a hearing aid having strict size constraints. Therefore, there is a need to provide a vibrator for a hearing aid having multiple vibrator sources with a minimal size increase of the hearing aid when comparing to a vibrator including a single vibrator source.

Furthermore, another constraint to the hearing aid is the power consumption. Currently power is supplied analog to the vibrator, which results in a movement of the transducer and a force output. By having more vibrator sources in the vibrator demands more advanced energy transfer algorithms for lowering the power consumption of the hearing aid.

Therefore, there is also a need to improve the power consumption of the hearing aid when including multiple vibrator sources for increasing the frequency range of the vibrations.

SUMMARY

An aspect of the present disclosure is to provide a hearing aid having a vibrator with an improved frequency bandwidth around a resonance frequency of the vibrator.

Another aspect of the present disclosure is to provide a hearing aid with improved power consumption when including a vibrator with an improved frequency bandwidth.

An even further aspect of the present disclosure is to provide a vibrator with the possibility of tuning the frequency bandwidth and/or the resonance frequency.

According to an aspect of the present disclosure, a hearing aid is disclosed. The hearing aid including a vibrator configured to apply a main vibration stimulation onto a skull of a recipient of the hearing aid. The vibrator may include a first assembly which comprises a magnet configured to provide a static magnetic flux and a coil configured to provide a dynamic magnetic flux based on a first current, and the coil may be wrapped around at least a part of the magnet. Furthermore, the vibrator includes a second assembly which includes a vibrator transfer unit and a suspension spring, and wherein the first assembly may be configured to move relative to the second assembly generating a first vibration based on the static and the dynamic magnetic flux, and the first vibration may be transferred to the vibrator transfer unit. Additionally, the vibrator includes a first piezo assembly configured to move based on a second current generating a second vibration, and wherein the first piezo assembly may be connected to the vibrator transfer unit, and when the first piezo assembly moves, a second vibration may be generated, and the second vibration may be transferred to the vibrator transfer unit. The main vibration which is transferred to a skull of the recipient via the vibrator transfer unit may include the first vibration and/or the second vibration.

The vibrator transfer unit may be shaped as a rod configured to receive the vibration (the first and/or the second vibration) and transfer the main vibration onto a skull either directly to the skull or via an implant screw fixated to the skull of the recipient. In another example, the vibrator transfer unit may be a plate with a protrusion wherein the plate is configured to receive the vibration and apply the main vibration via the protrusion directly onto the skull or via an implant screw fixated to the skull of the recipient. The implant screw in both examples may be replaced by a skin interface plate which is connected to the vibrator transfer unit and which is in direct contact to the skin of the recipient. In yet another example the vibrator transfer unit may be a plate which transfer the main vibration to a housing which is in directed contact to the skull of the recipient or indirect contact via skin and tissue of the recipient.

An advantage of the first assembly and the first piezo assembly are using the same vibrator transfer unit is that the size increase of the hearing aid due to applying an additional vibrator is rather limited, if any at all, as an additional vibrator transfer unit is not needed. The first piezo assembly may be integrated into the vibrator transfer unit in order to avoid any size increase of the hearing aid by applying an additional vibrator.

The housing may include the first assembly, the second assembly and the first piezo assembly. The housing may be implanted such that the housing has direct contact to the skull. In another example, the housing may be arranged directly onto the skin of the recipient or onto an abutment which is in contact with the skull of the recipient via an implant screw. A transcutaneous hearing aid is when the housing is implanted, and a percutaneous hearing aid is when the housing is in contact with the skull of the recipient via an implant screw.

The hearing aid may include a processing unit configured to control the first current and the second current based on an audio signal provided by at least one microphone of the hearing aid. The processing unit may be arranged within the housing, i.e. a first housing, or in a second housing, wherein the second housing may be connected to the first housing either wirelessly or via a wired connection. The second housing may be implanted or not implanted. The processing unit may be part of an external device, such as a computer or a portable device, such as a smartphone, a tablet or a smartwatch, wherein the external device is configured to communicate wirelessly to the first housing and/or the second housing.

The vibrator may comprise a second piezo assembly configured to move based on a third current and generate a third vibration, and wherein the second piezo assembly transfer the third vibration to the vibrator transfer unit, and wherein the main vibration to the skull includes at least the first vibration and/or the second vibration and/or the third vibration. The housing may also include the at least second piezo assembly. Applying at least the second piezo assembly results in an even more broader frequency bandwidth.

The first piezo assembly and/or the second assembly may include a multilayer piezoelectric element comprising two stacked piezoelectric layers, and a flexible passive layer disposed between and mounted to the piezoelectric layers, wherein the piezoelectric layers are configured to deform in response to application thereto of electrical signals, such as a current, generated based on the received sound signals. A mass component may be attached to the multilayer piezoelectric element so as to move in response to deformation of the piezoelectric element; and a coupling configured to attach the hearing aid to the recipient so as to transfer the main vibration, i.e. output forces, of the vibrator transfer unit to the recipient's skull.

The first piezo assembly and/or the second assembly may include a multilayer piezoelectric element comprising two stacked piezoelectric layers separated by a substantially flexible passive layer, wherein the piezoelectric layers have opposing directions of polarization such that application of electric signals, such as current, generated based on a received sound signals, to both of the layers causes deflection of the piezoelectric element in a single direction; a mass component attached to the multilayer piezoelectric element so as to move in response to deformation of the piezoelectric element; and a coupling configured to attach the hearing aid to the recipient so as to transfer the main vibration, i.e. output forces, generated by the multilayer piezoelectric element and the mass component to the recipient's skull.

The first piezo assembly may have at least a first end and a second end relative to a center of the first piezo assembly, and wherein the first piezo assembly may have a first connection to the vibrator transfer unit arranged at the first end or between the first end and the center and a second connection to the vibrator transfer unit arranged at the second end or between the second end and the center.

The at least second piezo assembly may have at least a first end and a second end relative to a center of the at least second piezo assembly, and wherein the at least second piezo assembly may have a first connection to the vibrator transfer unit arranged at the first end or between the first end and the center of the at least second piezo assembly and a second connection to the vibrator transfer unit arranged at the second end or between the second end and the center of the at least second piezo assembly.

The vibration generated by the first piezo assembly and/or the second piezo assembly may be transferred to the vibrator transfer unit via the first connection and the second connection, and the main vibration may then be forwarded by the vibrator transfer unit to the skull of the recipient. The first connection and the second connection may be made of a material which able to transfer vibration with a certain efficiency suitable for a hearing aid 1. For example, the both connections may be made of a plastic material or a metal material or a combination of the two materials. The connections may be welded or glued to either the piezo assembly and/or the vibrator transfer unit. Alternatively, the connections may be connectable to the piezo assembly and/or the vibrator transfer unit via a mechanical interface which makes it possible remove the piezo assembly from the vibrator transfer unit.

The first piezo assembly and/or the at least second piezo assembly may be connected to an outer surface of the vibrator transfer unit.

The vibrator transfer unit may include a plate on which the first piezo assembly is connected to. The plate may include a first surface which is directed towards the first assembly and a second surface which is opposite to the first surface. The first connection and the second connection may be applied onto the second surface of the vibrator transfer unit. Between the second surface and a surface of the housing of the vibrator available space may appear, and therefore, it would be of an advantage to arrange the first piezo assembly and/or the second piezo assembly within the available space as this will result in a limited size increase of the vibrator when having both the first assembly and the first piezo assembly and/or the second piezo assembly. The plate may include a protrusion wherein the plate is configured to receive the first and/or the at least second vibration and apply the main vibration which includes the first and/or the second vibration via the protrusion directly onto the skull or via an implant screw fixated to the skull of the recipient The vibrator transfer unit may have a vibrator transfer unit center, and the first piezo assembly and the at least second piezo assembly may be arranged symmetrically around the center of the vibrator transfer unit. By applying both piezo assemblies avoid any instability in the vibrator when both piezo assemblies are activated at the same.

The vibrator transfer unit may include a free-space region, wherein the first piezo assembly and/or the at least second piezo assembly may be arranged within the free-space region. By arranging the one or more of the piezo assemblies will have no or limited impact to the size of the hearing aid when applying one or more of the piezo assemblies into the vibrator. The first connection and the second connection of one or more of the piezo assemblies may be applied to an inner surface of the vibrator transfer unit.

In another example, the vibrator transfer unit may be a rod having an upper surface which is directed towards the first assembly, and the rod may have a side surface which the first piezo assembly and/or the second piezo assembly is applied to.

The first piezo assembly and/or the second piezo assembly may be arranged such that a center of the rod is overlapping the center of the first piezo assembly and/or the second piezo assembly. A mass may be applied onto the first end and the second end of the first piezo assembly and/or the second piezo assembly.

In another example, the first piezo assembly and/or may be arranged in a recess of the plate of the vibrator transfer unit, and wherein an upper surface of the plate may include the recess, and the upper surface may also be directed towards the first assembly configured to receive the first vibration provided by the first assembly.

The resonance frequency of the first and/or the second piezo assembly may be determined by a distance between the first connection and the second connection or a length of the first piezo assembly and/or the second piezo assembly when a mass is applied to the ends of the piezo assembly. The weight of the masses does also have an impact on the resonance frequency. During a manufacturing process or a fitting process of the hearing aid to the recipient it would be of benefit to be able to tune the resonance frequency specifically for the recipient for the purpose of obtaining an optimal frequency bandwidth and power consumption. The distance between the resonance frequency of the first assembly and the first piezo assembly is decisive for how improved the power consumption will be when activating both the first assembly and the piezo assembly.

A first position of the first connection on the first piezo assembly and/or the second piezo assembly and a second position of the second connection on the first piezo assembly and/or the second piezo assembly may be adjustable by a first adjustor and a second adjustor, respectively. The first adjustor and the second adjustor may be arranged within the vibrator transfer unit and is adjustable outside the vibrator transfer unit or outside the vibrator. Each of the adjustors, i.e. the first adjustor and the second adjustor, may include a slider and a screw, wherein the slider includes a first opening with threads configured for receiving the screw. The screw is penetrating the slide through the first opening and when turning the screw the position of the slider on the screw changes. The vibrator transfer unit includes an opening or a recess for controlling each of the adjustors. The slider is configured to be slidable applied on the piezo assembly so that when turning the screw the slider is configured to slide along a longitudinal axis of the piezo assembly with friction between the slider and the piezo assembly. The slider provides the connection of the piezo assembly to the vibrator assembly so that the second vibration generated by the piezo assembly is transferred to the vibrator transfer unit via the sliders. The slider may include a second opening configured to receive the piezo assembly. Both adjustors provide the possibility of both tuning and fine tuning the resonance frequency for obtaining an optimal performance of the piezo assembly.

The vibrator transfer unit may include a plurality of recesses configured to receive at least the first piezo assembly and/or the at least second piezo assembly, and wherein each of the recess of the plurality of recesses includes a first elevated plan and a second elevated plan relative to a ground plane of the recess of the plurality of recesses on which the first piezo assembly or the at least second piezo assembly is arranged, and the first elevation plan and the second elevation plan provides the first connection and the second connection, respectively. The second vibration generated by the piezo assembly is transferred into the vibrator transfer unit via the elevated plans. When arranging a piezo assembly on both the first elevated plan and the second elevated plan an air gap is present between at least a part of the piezo assembly and at least a part of the vibrator transfer unit. The air gap is needed for the piezo assembly to vibrate in response to a current. The plurality of recesses may have different lengths between the first and the second elevation plan providing different resonance frequencies for the first and/or the at least second piezo assembly. Thereby, it is possible to obtain different resonance frequencies of the piezo assembly depending on which of the plurality of recesses the piezo assembly is applied into. By applying the first and at least the second piezo assembly into each piezo assembly of the plurality of recesses the frequency bandwidth of the vibrator is further improved in view of only having one piezo assembly.

The vibrator transfer unit may be divided into two parts, an upper part having a first surface which includes another plurality of recesses that are similar to the plurality of recesses that is arranged in a first surface of the bottom part, and a second surface of the bottom part is configured to transfer the main vibration to the skull of the recipient. An air gap is provided between at least a part of the piezo assembly and at least a part of the first surface of both the upper part and the bottom part. The airgap on both sides of the piezo assembly is needed for the vibrator to vibrate in response to a current. The upper part and the bottom part may be attached by applying the first surface of the upper part against the first surface of the bottom part, and the upper part is fixated to the bottom part by one or more screws. In view of having screws and sliders for tuning the resonance frequency the plurality of recesses provides a simpler solution for tuning the resonance frequency of a piezo assembly i.e. the first piezo assembly and/or the second piezo assembly. However, the plurality of recesses provides limited possibility in fine tuning the resonance frequency in relation to the solution including screws and sliders. The vibrator transfer unit may include a combined tunable solution which includes both the screws and the sliders and the plurality of recesses having different resonance frequencies.

Combining the screws and the sliders and the plurality of recesses provides the possibility of designing the screws and the sliders less complicated as they are only used for providing the possibility of fine tuning the resonance frequency of between +/−5 Hz and 50 +/−50 Hz. In the solution where the screws and sliders are not combined with the plurality of recesses having different resonance frequencies the tuning of the resonance frequency may be between +/−5 H<to +/−2500 Hz. The wider tunable frequency range results in a more complex design of the screws and the sliders.

To obtain an even simpler tunable solution which provides tunability of larger than +/−50 Hz the plurality of recesses may be formed into one tapered recess wherein a distance between the first elevated plan and the second elevated plan of the tapered recess has different lengths along a horizontal axis which is about parallel to the skull of the recipient when wearing the hearing aid. The elevated plans may be tapered shaped such that the distance between the first elevated plans and the second elevated plans reduces or increases along the horizontal axis which is also about parallel to a bottom surface of the housing of the vibrator.

On the second surface of the bottom part of the vibrator transfer unit includes a protrusion configured to transfer the main vibration outside the housing and into the skull.

The piezo assembly, the first and/or the at least second piezo assembly, may be configured to receive a current, a first and/or a second current, in which the level is determined based on an audio signal or a first vibration provided by the first assembly. The hearing aid may include a sensor configured to monitor an output force of the second assembly and provide a monitor signal, and a processing unit configured to determine the level of the first current and/or the second current based on the monitor signal to obtain a wanted output force of the second assembly. The sensor may be arranged such that it is in contact with the vibrator transfer unit for detecting/monitoring the main vibration. The sensor may be the first piezo assembly, and the processing unit may be configured to determine the level of the first current to obtain a wanted output force of the vibrator transfer unit, i.e. the second assembly.

The first piezo assembly may be a sensor configured to monitor an output force of the second assembly provided by the main vibration which includes the first vibration, and wherein a processing unit may be configured to determine whether the second current should be applied to the piezo assembly for boosting the force of the main vibration based on a monitor signal provided by the sensor. The monitor signal is based on the monitored output force which the sensor detects via the connection to the vibrator transfer unit. The processing unit may be configured to set the first piezo assembly into a transducer mode configured to boost the main vibration or a sensor mode configured to monitor the output force of the second assembly.

The hearing aid may include a processing unit configured to control the second current and the first current such that the movement of the first piezo assembly and the movement of the first assembly interacts such that the first vibration and the second vibration interacts resulting in the main vibration being transferred to the skull by the vibrator transfer unit. By activating both the first assembly and the piezo assembly results in an improved power consumption as the first assembly has a highly inductive behavior to the piezo assembly (the first and/or the second piezo assembly), and the piezo assembly has a highly capacitive behavior. That results in that the piezo assembly recovers some of the energy generated by the first assembly, and that energy is used for generating the second current (and/or the third current) used for activating the first piezo assembly (and/or the second piezo assembly).

Aforementioned features shall be considered to be disclosed in any combination with each other. Further, the disclosure of any means for performing a method step shall be understood to also disclose the respective method step and the disclosure of a method step shall be understood to also disclose respective means for performing the step.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1A:
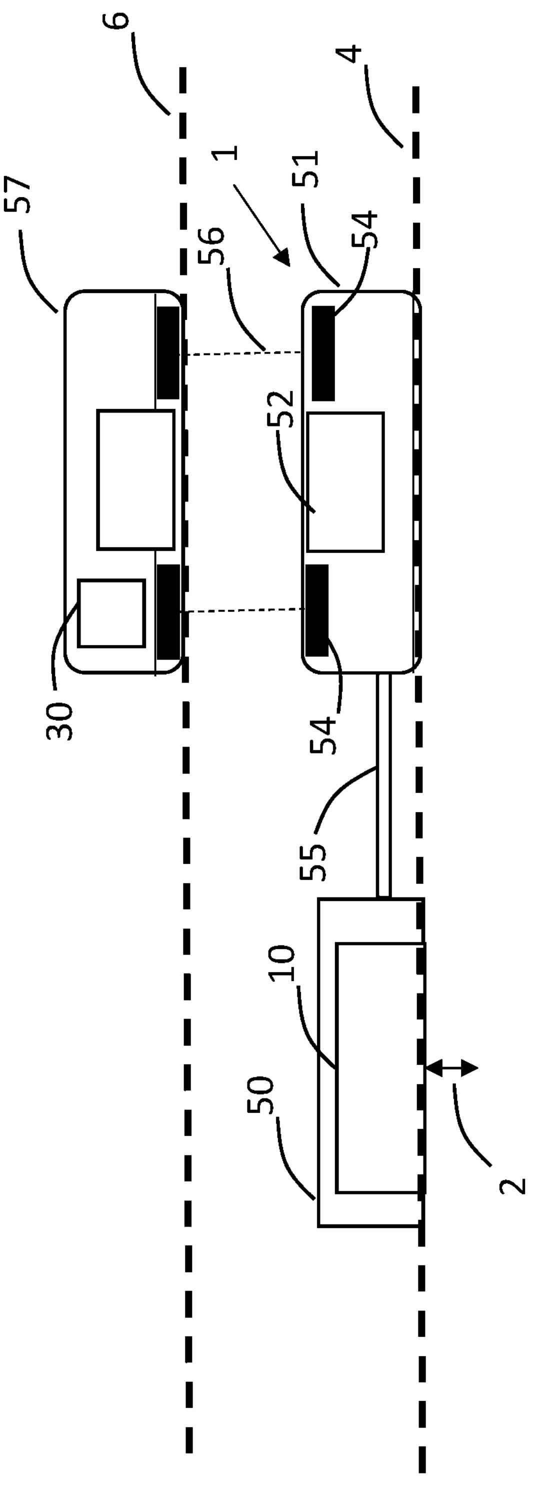
FIGS. 1A to 1C illustrate different examples of a hearing aid.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

A hearing aid may be adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. 'Improving or augmenting the hearing capability of a user' may include compensating for an individual user's specific hearing loss. Such audible signals may be provided in the form of an acoustic signal radiated into the user's outer ear, or an acoustic signal transferred as mechanical vibrations to the user's inner ears through bone structure of the user's head and/or through parts of the middle ear of the user or electric signals transferred directly or indirectly to the cochlear nerve and/or to the auditory cortex of the user.

A "hearing system" refers to a system comprising one or two hearing devices, and a "binaural hearing system" or a bimodal hearing system refers to a system comprising two hearing aids where the hearing aids are adapted to cooperatively provide audible signals to both of the user's ears either by acoustic stimulation only, acoustic and mechanical stimulation, mechanical stimulation only, acoustic and electrical stimulation, mechanical and electrical stimulation or only electrical stimulation. The hearing system, the binaural hearing system or the bimodal hearing system may further include one or more auxiliary device(s) that communicates with at least one hearing aid, the auxiliary device affecting the operation of the hearing aids and/or benefitting from the functioning of the hearing aids. A wired or wireless communication link between the at least one hearing aid and the auxiliary device is established that allows for exchanging information (e.g. control and status signals, possibly audio signals) between the at least one hearing device and the auxiliary device. Such auxiliary devices may include at least one of a remote control, a remote microphone, an audio gateway device, a wireless communication device, e.g. a mobile phone (such as a smartphone) or a tablet or another device, e.g. comprising a graphical interface, a public-address system, a car audio system or a music player, or a combination thereof. The audio gateway may be adapted to receive a multitude of audio signals such as from an entertainment device like a TV or a music player, a telephone apparatus like a mobile telephone or a computer, e.g. a PC. The auxiliary device may further be adapted to (e.g. allow a user to) select and/or combine an appropriate one of the received audio signals (or combination of signals) for transmission to the at least one hearing device. The remote control is adapted to control functionality and/or operation of the at least one hearing device. The function of the remote control may be implemented in a smartphone or other (e.g. portable) electronic device, the smartphone/electronic device possibly running an application (APP) that controls functionality of the at least one hearing device.

In general, a hearing aid includes i) an input unit such as a microphone for receiving an acoustic signal from a user's surroundings and providing a corresponding input audio signal, and/or ii) a receiving unit for electronically receiving an input audio signal. The hearing aid further includes a processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to (relatively) enhance a target acoustic source among a multitude of acoustic sources in the user's environment and/or to attenuate other sources (e.g. noise). In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc. The output unit may include an one or more output transducers such as a loudspeaker/receiver for providing an air-borne acoustic signal to the ear of the user, a mechanical stimulation applied transcutaneously or percutaneously to the skull bone, an electrical stimulation applied to auditory nerve fibers of a cochlea of the user. In some hearing aids, the output unit may include one or more output electrodes for providing the electrical stimulations such as in a Cochlear Implant, or the output unit may include one or more vibrators for providing the mechanical stimulation to the skull bone.

Figure 1C:
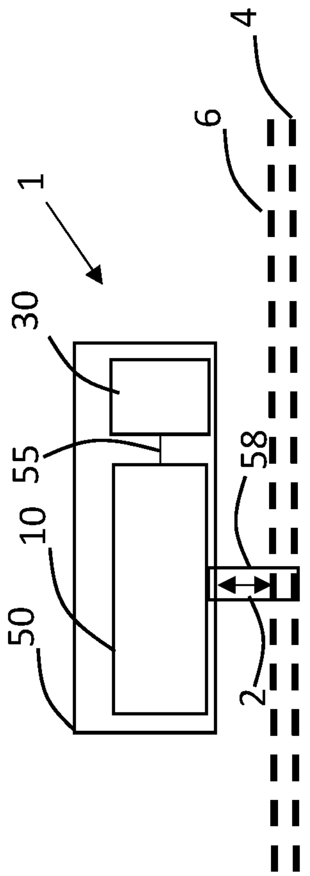
Figure 1B:
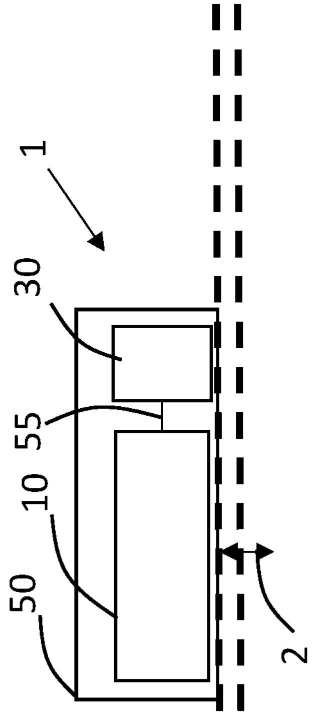

FIGS. 1A to 1C illustrate different examples of a hearing aid 1 configured to apply a main vibration 2 onto a skull 4 of a recipient of the hearing aid 1. FIG. 1A illustrates an example where the hearing aid includes a first housing 50 and a second housing 51 which are connected by one or more wires 55. In another example the connection may be wireless. The first housing 50 includes a vibrator 10, and the second housing 51 includes a coil 54 configured to communicate 56 inductively and through the skin 6 and to an external device 57. The second housing 51 includes a magnet apparatus 52 configured to attract the external device 57. In this example, a processing unit 30 is arranged within the external device 57. The processing unit is configured to control the vibrator 10 and the communication 56 which includes power to activate the vibrator 10. The communication 56 may include information and/or power. The communication 56 may be bidirectional including information and/or power. In FIG. 1B, the vibrator 10 and the processing unit 30 are arranged within the first housing 50 and are connected via one or more wires 55. In this example, the hearing aid 1 is arranged on the skin 6, and in FIG. 1C the first housing 50 is connected to the skull 4 via an implant screw 58, and in this example the vibration 2 is transferred to the skull via the implant screw 58, and in FIG. 1B the vibration 2 is transferred to the skull 4 via the first housing 50.

Figure 2A:
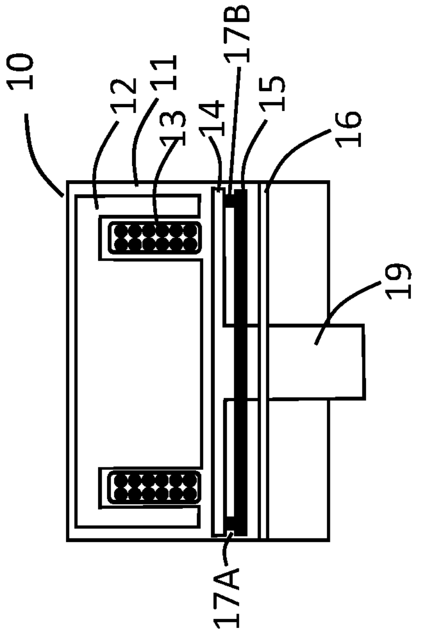
FIGS. 2A to 2D illustrate a cross-section of different examples of a vibrator.
Figure 2B:
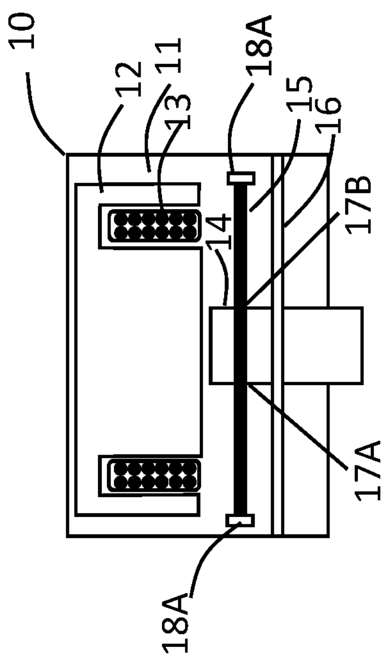
Figure 2C:
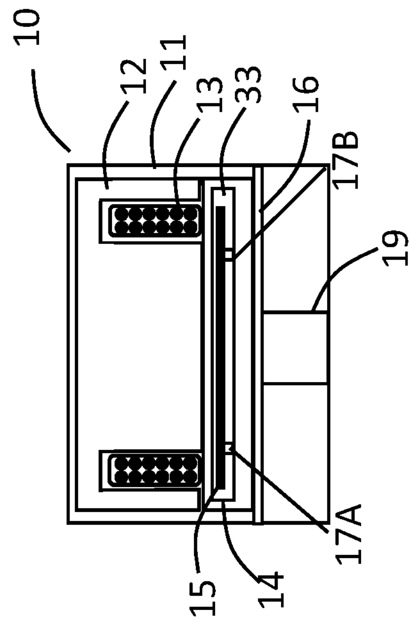
Figure 2D:
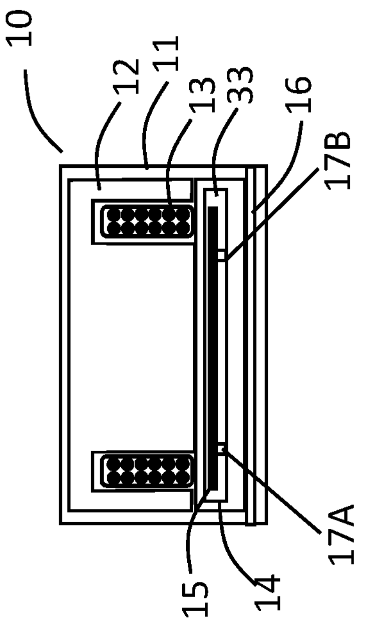

FIGS. 2A to 2D illustrate a cross-section of different examples of the vibrator 10. In each of the different examples, the vibrator 10 comprises a first assembly 11 which includes a magnet 12 configured to provide a static magnetic flux and a coil 13 configured to provide a dynamic magnetic flux based on a first current, and in the present examples the coil is arranged around at least a part of the magnet 12. Furthermore, the vibrator 10 includes a second assembly which includes a vibrator transfer unit 14 and a suspension spring 16, and wherein the first assembly 11 is configured to move relative to the second assembly generating a first vibration based on the static and the dynamic magnetic flux, and the first vibration is transferred to the vibrator transfer unit 14. The vibrator 10 includes another vibrator source. This another vibrator source is a first piezo assembly 15 configured to move based on a second current generating a second vibration. In the present examples, the first piezo 15 assembly is connected (17A, 17B) to the vibrator transfer unit 14, and when the first piezo assembly 15 moves a second vibration is generated, and the second vibration is transferred to the vibrator transfer unit 14. The vibrator 10 generates the main vibration 2 which is transferred to a skull of the recipient via the vibrator transfer unit 14, and wherein the vibration includes the first vibration and/or the second vibration. In the present examples, the first piezo assembly 15 may be rectangular shaped or circular shaped. The first piezo assembly 15 may have at least a first end and a second end relative to a center of the first piezo assembly 15, and wherein the first piezo assembly 15 has a first connection 17A to the vibrator transfer unit 14 arranged at the first end or between the first end and the center and a second connection to the vibrator transfer unit 14 arranged at the second end or between the second end and the center. FIG. 2A illustrates an example of the vibrator 10 where the vibrator transfer unit 14 includes a plate 14 which has a first surface directed towards the first assembly 11 and a second surface opposite to the first surface. On the second surface a protrusion 19 is applied or build into the 14, and the protrusion is configured to transfer the main vibration 2 outside the vibrator 10 and eventually to the skull of the recipient. Furthermore, the first piezo assembly is connected to the second surface having at least two connections, i.e. a first connection 17A and a second connection 17B, to the second surface, and the generated second vibration is transferred via the connections to the vibrator transfer unit 10, and in the vibrator transfer unit 10 the main vibration 2 which includes the second vibration is transferred from the plate 14 and to the protrusion 19 and out of the vibrator 10. In FIG. 2B, the vibrator transfer unit 14 is a rod on which the first piezo assembly 15 is connected to via the first 17A and second 17B connection. At the first end and the second end a first mass 18A and a second mass 18B are applied to, respectively. In this example, when a current is applied to the piezo assembly 15 the ends are bending creating a vibration which is then applied to the rod 14 via the first 17A and second 17B connection. In FIG. 2C the first piezo assembly 15 is arranged within a free-space section 33 of the vibrator transfer unit 14. In this example, the first piezo assembly 15 is connected to an inner side of the free-space section 33 via the first 17A and the second 17B connection. It will be of an advantage to connect the first piezo assembly 15 to an inner side of the free-space section 33 which is directed towards the protrusion 19 for the purpose of improving the efficiency of the first piezo assembly 15. FIG. 2D illustrates a similar example as in FIG. 2C but without the protrusion 2C. In this example, the vibrator transfer unit 14 is a plate which transfer the main vibration 2 to a surface of the housing 10 which is directed towards the skull 4 when the recipient is wearing the hearing aid 1. In the examples illustrated in FIGS. 2A to 2D the connections (17A, 17B) are arranged on a surface of the vibrator transfer unit 14 which is directed away from the first assembly 11.

Figure 3A:
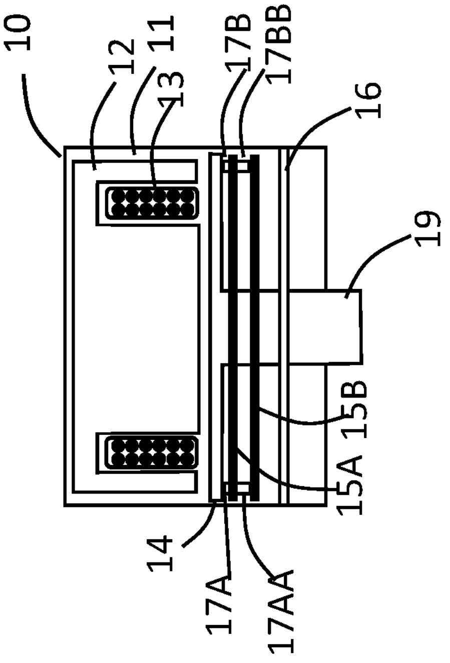
FIGS. 3A to 3D illustrate a cross-section of different examples of a vibrator.
Figure 3B:
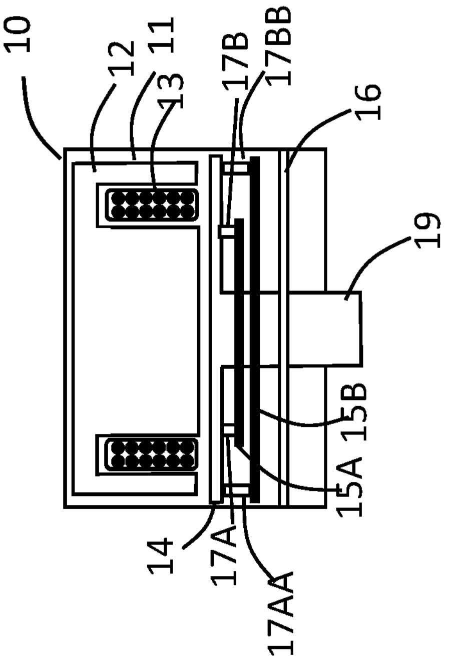
Figure 3C:
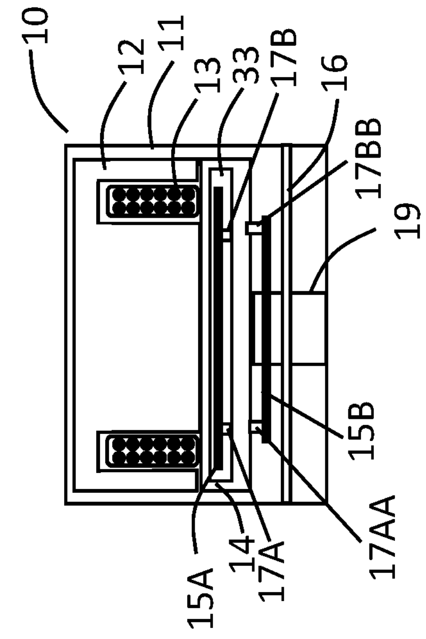
Figure 3D:
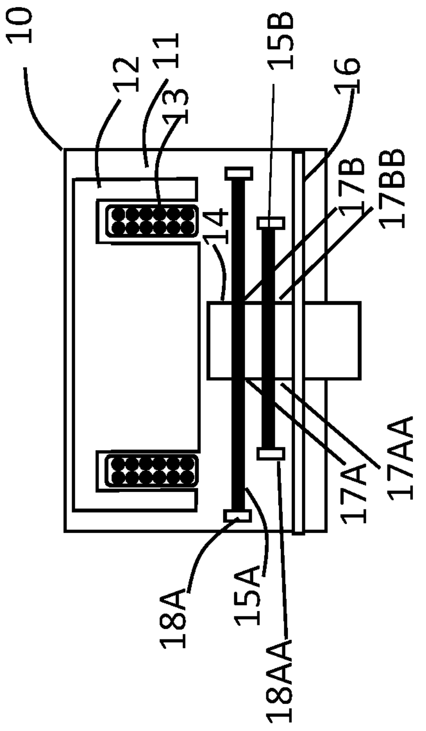

FIGS. 3A to 3D illustrate a cross-section of different examples of the vibrator 10 including both the first piezo assembly 15A and a second piezo assembly 15B. In FIG. 3A the first piezo assembly 15A is connected to the vibrator transfer unit 14 via the first 17A and the second 17B connection, and the second piezo assembly 15B is connected to the vibrator transfer unit 14 via the first 17AA and the second 17BB connection. In this example, the connections of both piezo assemblies (15A, 15B) are overlapping, and a length of both piezo assemblies (15A, 15B) are the same. In this example, the piezo assemblies (15A, 15B) are used for boosting the main vibration 2 within a specific frequency. While activating both piezo assemblies (15A, 15B) at the same time results in a significant increase of the force applied to the skull via the main vibration 2. The first 17AA and the second 17BB connection of the second piezo assembly 15B may be connected to the vibrator transfer unit 14 via the first and the second connection of the first piezo assembly 15A. In FIG. 3B, the first connection 17A and the second connection of the first piezo assembly 15 is arranged between the first connection 17AA and the second connection 17BB of the second piezo assembly. In this example, the length of the first 15A and the second 15B piezo assembly is different, wherein the first piezo assembly 15A is shorter than the second piezo assembly resulting in different resonance frequencies. The connections (17A, 17AA, 17B, 17BB) of both piezo assemblies are directly applied to the vibrator transfer unit 14. Both piezo assemblies extend mainly in a direction perpendicular to a longitudinal axis of the protrusion (19). The longitudinal axis is partially perpendicular to a skull surface of the recipient of the hearing aid when the recipient wears the hearing aid. Both piezo assemblies have a longitudinal axis which is orthogonal to the longitudinal axis of the protrusion (19). Both piezo assemblies has two ends between the longitudinal axis, and the connections (17A, 17AA, 17B, 17BB) may be arranged at the ends or between the two ends of the respective piezo assembly. Between the connections (17AA, 17BB) of the second piezo assembly 15B the first piezo assembly 15A is arranged, and thereby, it is possible to design a vibrator having a piezo assembly with an improved frequency bandwidth and more compact as the free space between the connections (17AA,17BB) of the second piezo assembly is explored by another piezo assembly. FIG. 3C illustrates yet another example of the vibrator 10. In this example, the vibrator transfer unit 14 is a plate having a thickness which is suitable for arranging a first piezo assembly 15A within a free space area of the plate. In this example the free space area is a closed free space area which is surrounded by a material of the plate. In this example, the connections (17A,17B) of the first piezo assembly 15A are arranged onto an inner surface of the vibrator transfer unit 14. A second piezo assembly is connected (17AA, 17BB) to a surface of the vibrator transfer unit 14 which is opposite to another surface facing the first assembly 11. The second piezo assembly 15B is arranged between the vibrator transfer unit 14 and the suspension spring 16. In FIG. 3D the vibrator transfer unit 14 is an elongated shaped protrusion which may be shaped as a rectangular, a conical or a cylindrical protrusion. The vibrator transfer unit 14 has a side surface on which the piezo assemblies (15A,15B) are connected (17A, 17B,17AA,17BB) to. At each end of the piezo assemblies (15A,15B) a mass (18A,18AA) is applied and the masses for each of the piezo assembly (15A,15B) have a certain weight for obtaining a certain resonance frequency. In this example, the piezo assemblies are circular or square shaped having an opening in the center configured to receive the vibrator transfer unit 14.

Figure 4A:
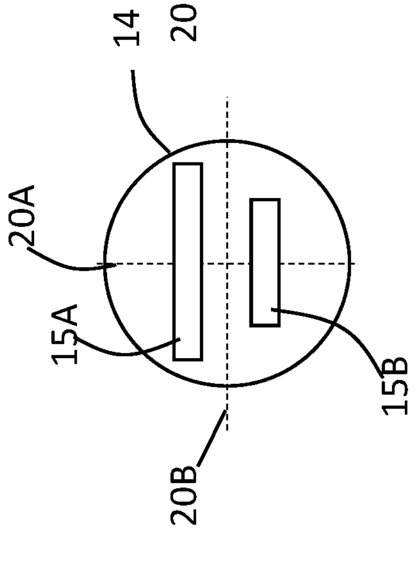
FIGS. 4A to 4C illustrate different examples of a vibrator transfer unit.
Figure 4B:
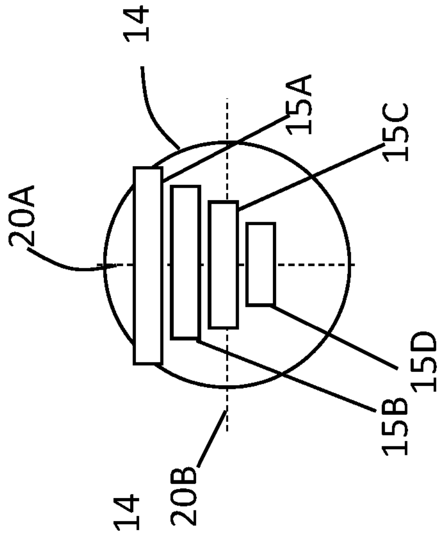
Figure 4C:
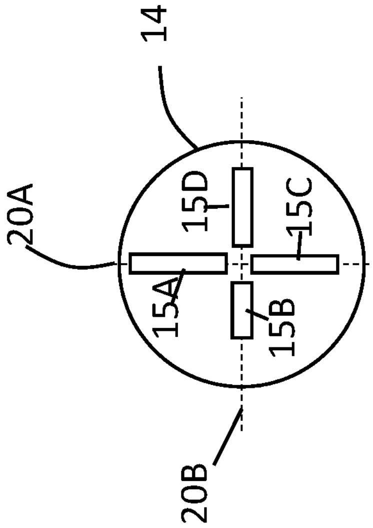

FIGS. 4A to 4C illustrate different examples of a vibrator transfer unit 14. In these examples, the vibrator transfer unit 14 is circular shaped. In another example, the vibrator transfer unit 14 may be square shaped or any shape which has an optimal shape to a housing accommodating the vibrator 10. The optimal shape results in an even more compact size of the housing. Furthermore, the vibrator transfer unit 14 includes a first axis 20A and a second axis 20B intersecting at a center of the vibrator transfer unit 14. In FIG. 4A, a first piezo assembly 15A is arranged on a side of the second axis 20B which is opposite to the side on which a second piezo assembly 15B is arranged. In this specific example, the lengths of the piezo assemblies (15A, 15B) are different for the purpose of improving the frequency bandwidth of the vibrator 10. In another example, the lengths may be the same for the purpose of using the second piezo assembly 15B for boosting the output force of the main vibration. In this example, the processing unit may be configured to turn on or off the second piezo assembly 15B for boosting the output force based on an audio signal provided by a microphone of the hearing aid. In another example the boosting may be initiated by the processing unit if an error is detected on the first piezo assembly. The error may result in a lower output force which is detected by the processing unit and a sensor. The sensor may be the second piezo assembly 15B. In this example, the boosting results in an output force which corresponds to the output force of a fully functional piezo assembly 15A. FIG. 4B illustrates yet another example of the vibrator transfer unit 14, and in this example, the unit 14 includes four piezo assemblies (15A-15D) all having different lengths. In this example, the piezo assemblies (15A-15D) are arranged asymmetric around the second axis 20B but symmetrical around the first axis 20A. In FIG. 4C, the four piezo assemblies are arranged symmetrically around both the first and the second axis (20A, 20B). This example provides a more harmonic vibration onto the vibrator transfer unit 14.

Figure 5A:
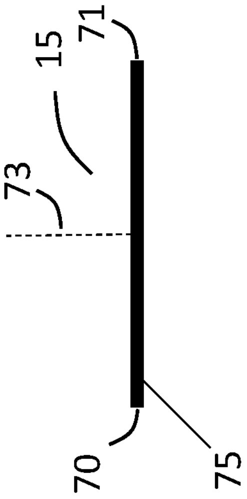
FIGS. 5A and 5B illustrate a piezo assembly.
Figure 5B:
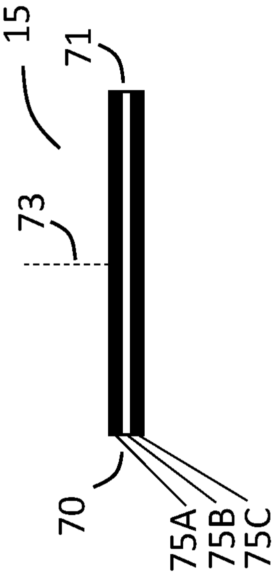

FIGS. 5A and 5B illustrate a piezo assembly 15, and FIG. 5A illustrates a piezo assembly 15 having a single layer 75 comprising a conductive material, and FIG. 5B illustrates a piezo assembly 15 having multiple layers (75A-75C) of same conductive material or different conductive materials. Each of the layers (75,75A-75C) has a first end 70 and a second end 71 relative to a center 73 of the piezo assembly 15.

Figures 6A, 6B, 6C, 6D, 6E:
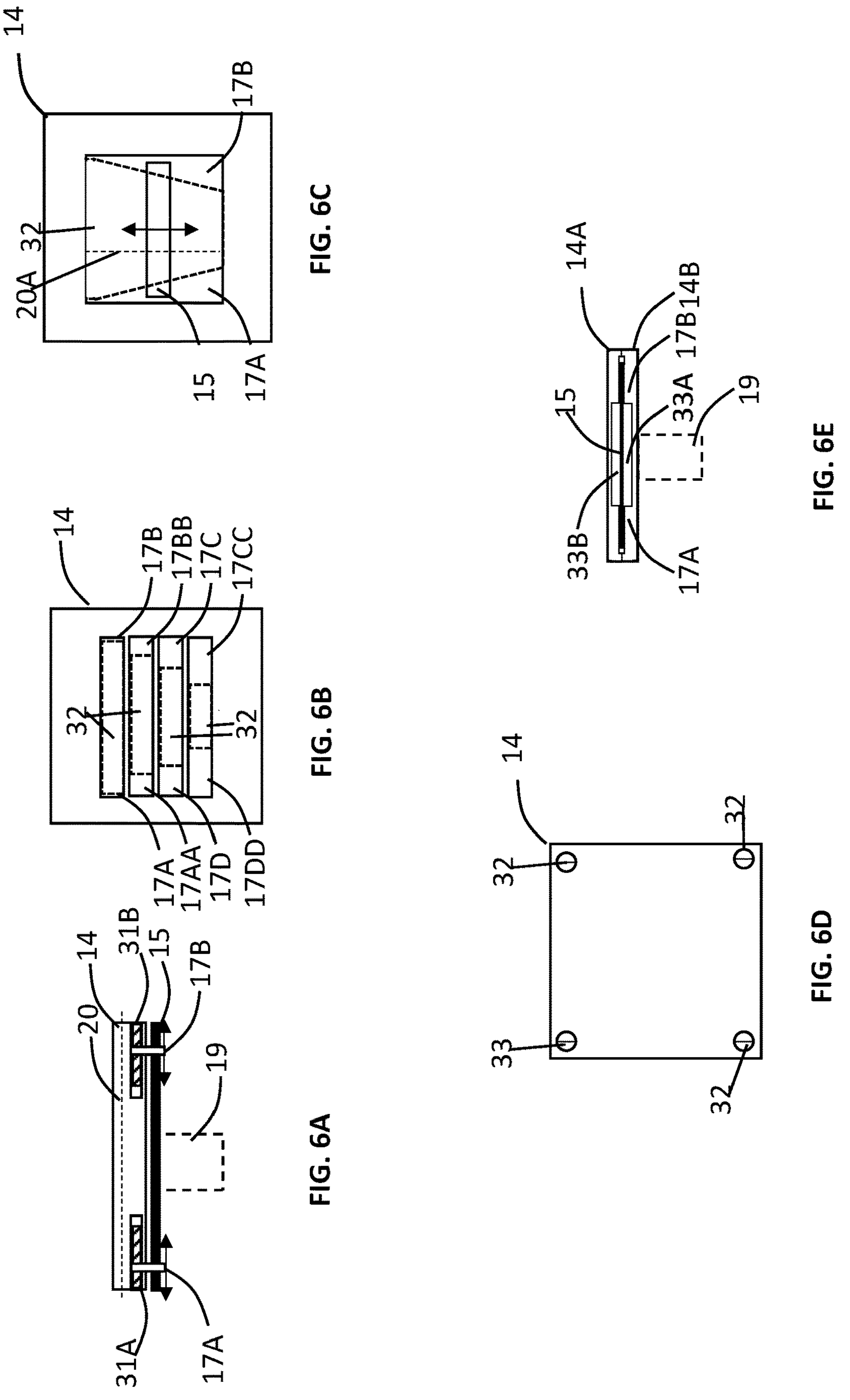
FIGS. 6A to 6E illustrate a vibrator transfer unit.

FIGS. 6A to 6E illustrate a vibrator transfer unit 14 including means for adjusting the position of the connections (17A,17B,17AA,17BB) that results in a change of the resonance frequency of each piezo assembly. This may also affect the frequency bandwidth of the vibrator 10. The possibility of having means for adjusting the resonance frequency is needed if wanting to either tuning or fine tuning the resonance frequency or the frequency bandwidth of the vibrator 10 specifically for the recipient of the hearing aid. FIG. 6A illustrates an example which includes a first adjustor 31A and a second adjustor 31B both arranged within the vibrator transfer unit 14 but accessible outside the vibrator transfer unit 14. In this example, both adjustors (31A, 31B) are a screw which is connected to a connector (17A,17B) which is configured to slide in a direction parallel to an axis 20 while turning the screw. Thereby, it is possible to adjust the distance between the connections (17A, 17B) while turning the screws (31A,31B). In this example, the vibrator transfer unit 14 may optionally have a protrusion 19. In FIG. 6B, the vibrator transfer unit 14 is square shaped which makes it possible to apply more piezo assemblies (15) with certain lengths than if the vibrator transfer unit 14 was circular shaped. In this example, the vibrator transfer unit includes multiple recesses 32 where each of the recess includes a first connection (17A,17AA,17D,17DD) and a second connection (17B,17BB,17C,17CC), and where the first connection and the connection is an elevated plane in relative to a ground plane formed between the first and second connection. When arranging a piezo assembly 15 onto the elevated planes (17A,17AA,17D,17DD, 17B, 17BB,17C,17CC), a free space is obtained between the piezo assembly 15 and the ground plane. The free space allows the piezo assembly 15 to vibrate. In the example illustrated in FIG. 6B, the length of the ground plane is different. The vibrator transfer unit 14 provides the possibility for adjusting the resonance frequency and/or the frequency bandwidth of the vibrator. It is obvious that similar effect will appear if arranging a plurality of piezo assemblies into two or more of the recesses. FIG. 6C illustrates an example where the plurality of recesses is formed into one tapered recesses 32. The vibrator transfer unit 14 includes a first connection 17A and a second connection 17B having a distance between the first and the second connection (17A,17B) which varies along the first axis 20A. The variation in distance is tapered shaped meaning that the distance gradually changes along the first axis 20A. The first connection and the second connection (17A, 17B) are elevated planes in relative to a ground plane arranged between the first and the second connection (17A, 17B). The plurality of recesses 32 is formed into one tapered recess wherein a distance between the first elevated plan 17A and the second elevated plan 17B of the tapered recess 32 has different lengths along a horizontal axis 20A which is about parallel to the skull of the recipient when wearing the hearing aid. FIGS. 6D and 6E illustrate that the vibrator transfer unit 14 comprises a first part 14A and a second part 14B which are mirrored in such a way that both parts (14A, 14B) include the plurality of recesses 32. In FIG. 6E, one of the parts (14A,14B) includes optionally the protrusion 19.

Figure 7:
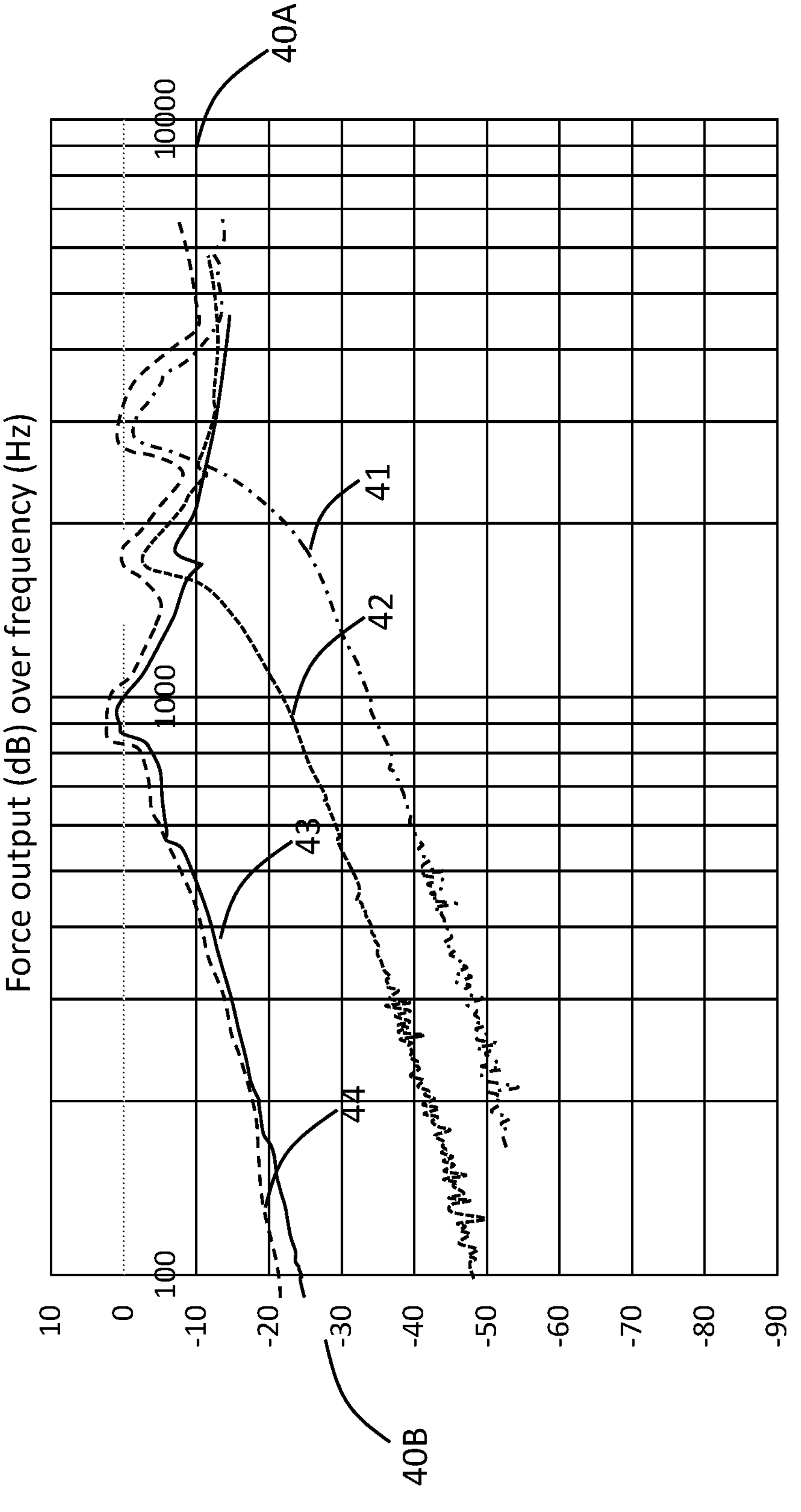
FIG. 7 illustrates a curve including measured force output.

FIG. 7 illustrates a curve including measured force output (43,42,41) versus frequency for the vibrator 10. The full line 43 illustrates the output force of the first assembly 11, the dotted line 42 is the output force of the first piezo assembly 15A, and the space-dotted line 41 is the output force of the second piezo assembly 15B. The curve 44 illustrates the main vibration created by the vibrations provided by the three assemblies (11, 15A, 15B).

In all of the figures mentioned above, the hearing aid may include a sensor configured to monitor an output force of the first piezo assembly, i.e. the second assembly (15), and provide a monitor signal, and the processing unit 30 is configured to determine the level of the first current and/or the second current based on the monitor signal to obtain a wanted output force of the second assembly 15. The sensor is the first piezo assembly 15, and the processing unit is configured to determine the level of the first current to obtain a wanted output force of the second assembly. In another example, the second piezo assembly 15B may be the sensor.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A hearing aid configured to apply a main vibration onto a skull of a recipient of the hearing aid, and wherein the hearing aid includes a vibrator comprising:

a first assembly which comprises a magnet configured to provide a static magnetic flux and a coil configured to provide a dynamic magnetic flux based on a first current, and the coil is wrapped around at least a part of the magnet, a second assembly which includes a vibrator transfer unit and a suspension spring, and wherein the first assembly is configured to move relative to the second assembly generating a first vibration based on the static and the dynamic magnetic flux, and the first vibration is transferred to the vibrator transfer unit, a first piezo assembly configured to move based on a second current generating a second vibration, and wherein the first piezo assembly is connected to the vibrator transfer unit, and when the first piezo assembly moves a second vibration is generated, and the second vibration is transferred to the vibrator transfer unit, and wherein the main vibration is transferred to a skull of the recipient via the vibrator transfer unit, wherein the vibration includes the first vibration and/or the second vibration, and wherein the hearing aid further comprises a sensor configured to monitor an output force of the second assembly and provide a monitor signal, and a processing unit configured to determine the level of the first current and/or the second current based on the monitor signal to obtain a wanted output force of the second assembly.

2. A hearing aid according to claim 1, wherein the vibrator includes at least a second piezo assembly configured to move based on a third current and generate a third vibration, and wherein the at least second piezo assembly transfer the third vibration to the vibrator transfer unit, and wherein the main vibration to the skull includes at least the first vibration and/or the second vibration and/or the third vibration.

3. A hearing aid according to claim 2, wherein the at least second piezo assembly has at least a first end and a second end relative to a center of the at least second piezo assembly, and wherein the at least second piezo assembly has a first connection to the vibrator transfer unit arranged at the first end or between the first end and the center of the at least second piezo assembly and a second connection to the vibrator transfer unit arranged at the second end or between the second end and the center of the at least second piezo assembly.

4. A hearing aid according to claim 2, wherein the first piezo assembly and/or the at least second piezo assembly is connected to an outer surface of the vibrator transfer unit.

5. A hearing aid according to claim 2, wherein a free-space region is arranged within the vibrator transfer unit, and wherein the first piezo assembly and/or the at least second piezo assembly is arranged within the free-space region.

6. A hearing aid according to claim 1, wherein the first piezo assembly has at least a first end and a second end relative to a center of the first piezo assembly, and wherein the first piezo assembly has a first connection to the vibrator transfer unit arranged at the first end or between the first end and the center and a second connection to the vibrator transfer unit arranged at the second end or between the second end and the center.

7. A hearing aid according to claim 6, wherein the vibrator transfer unit includes a vibrator transfer unit center, and the first piezo assembly and the at least second piezo assembly are arranged symmetrically around the center of the vibrator transfer unit.

8. A hearing aid according to claim 6, wherein the vibrator transfer unit includes a plurality of recesses configured to receive at least the first piezo assembly and/or the at least second piezo assembly, and wherein each of the recess of the plurality of recesses includes a first elevated plan and a second elevated plan in relative to a ground plane of the recess of the plurality of recesses on which the first piezo assembly or the at least second piezo assembly is arranged, and the first elevation plan and the second elevation plan provides the first connection and the second connection, respectively.

9. A hearing aid according to claim 1, wherein the processing unit is configured to control the first current and the second current such that the movement of the first piezo assembly and the movement of the first assembly interacts such that the first vibration and the second vibration interacts resulting in the main vibration being transferred to the skull by the vibrator transfer unit.

10. A hearing aid according to claim 1, wherein the sensor is the first piezo assembly, and the processing unit is configured to determine the level of the first current to obtain a wanted output force of the second assembly.

11. A hearing aid configured to apply a main vibration onto a skull of a recipient of the hearing aid, and wherein the hearing aid includes a vibrator comprising:
- a first assembly which comprises a magnet configured to provide a static magnetic flux and a coil configured to provide a dynamic magnetic flux based on a first current, and the coil is wrapped around at least a part of the magnet,
- a second assembly which includes a vibrator transfer unit and a suspension spring, and wherein the first assembly is configured to move relative to the second assembly generating a first vibration based on the static and the dynamic magnetic flux, and the first vibration is transferred to the vibrator transfer unit,
- a first piezo assembly configured to move based on a second current generating a second vibration, and wherein the first piezo assembly is connected to the vibrator transfer unit. and when the first piezo assembly moves a second vibration is generated, and the second vibration is transferred to the vibrator transfer unit, and
- wherein the main vibration is transferred to a skull of the recipient via the vibrator transfer unit, wherein the vibration includes the first vibration and/or the second vibration,
- wherein the first piezo assembly has at least a first end and a second end relative to a center of the first piezo assembly, and wherein the first piezo assembly has a first connection to the vibrator transfer unit arranged at the first end or between the first end and the center and a second connection to the vibrator transfer unit arranged at the second end or between the second end and the center, and
- wherein a first position of the first connection on the first piezo assembly and a second position of the second connection on the first piezo assembly are adjustable by a first adjustor and a second adjustor, respectively.

12. A hearing aid according to claim 11, comprising a processing unit configured to determine the first current and the second current based on an audio signal provided by at least one microphone of the hearing aid.

13. A hearing aid according to claim 11, wherein each of the first adjustor and the second adjustor is arranged within the vibrator transfer unit and is adjustable outside the vibrator transfer unit or outside the vibrator.

14. A hearing aid configured to apply a main vibration onto a skull of a recipient of the hearing aid, and wherein the hearing aid includes a vibrator comprising:
- a first assembly which comprises a magnet configured to provide a static magnetic flux and a coil configured to provide a dynamic magnetic flux based on a first current, and the coil is wrapped around at least a part of the magnet,
- a second assembly which includes a vibrator transfer unit and a suspension spring, and wherein the first assembly is configured to move relative to the second assembly generating a first vibration based on the static and the dynamic magnetic flux, and the first vibration is transferred to the vibrator transfer unit,
- a first piezo assembly configured to move based on a second current generating a second vibration, and wherein the first piezo assembly is connected to the vibrator transfer unit, and when the first piezo assembly moves a second vibration is generated, and the second vibration is transferred to the vibrator transfer unit, and
- wherein the main vibration is transferred to a skull of the recipient via the vibrator transfer unit, wherein the vibration includes the first vibration and/or the second vibration,
- wherein the first piezo assembly has at least a first end and a second end relative to a center of the first piezo assembly, and wherein the first piezo assembly has a first connection to the vibrator transfer unit arranged at the first end or between the first end and the center and a second connection to the vibrator transfer unit arranged at the second end or between the second end and the center,
- wherein the vibrator transfer unit includes a plurality of recesses configured to receive at least the first piezo assembly and/or the at least second piezo assembly, and wherein each of the recess of the plurality of recesses includes a first elevated plan and a second elevated plan in relative to a ground plane of the recess of the plurality of recesses on which the first piezo assembly or the at least second piezo assembly is arranged, and the first elevation plan and the second elevation plan provides the first connection and the second connection, respectively, and
- wherein the plurality of recesses has different lengths between the first and the second elevation plan providing different resonance frequencies for the first and/or the at least second piezo assembly.

15. A hearing aid configured to apply a main vibration onto a skull of a recipient of the hearing aid, and wherein the hearing aid includes a vibrator comprising:

a first assembly which comprises a magnet configured to provide a static magnetic flux and a coil configured to provide a dynamic magnetic flux based on a first current, and the coil is wrapped around at least a part of the magnet, a second assembly which includes a vibrator transfer unit and a suspension spring, and wherein the first assembly is configured to move relative to the second assembly generating a first vibration based on the static and the dynamic magnetic flux, and the first vibration is transferred to the vibrator transfer unit, a first piezo assembly configured to move based on a second current generating a second vibration, and wherein the first piezo assembly is connected to the vibrator transfer unit, and when the first piezo assembly moves a second vibration is generated, and the second vibration is transferred to the vibrator transfer unit, and wherein the main vibration is transferred to a skull of the recipient via the vibrator transfer unit, wherein the vibration includes the first vibration and/or the second vibration, wherein the first piezo assembly has at least a first end and a second end relative to a center of the first piezo assembly, and wherein the first piezo assembly has a first connection to the vibrator transfer unit arranged at the first end or between the first end and the center and a second connection to the vibrator transfer unit arranged at the second end or between the second end and the center, wherein the vibrator transfer unit includes a plurality of recesses configured to receive at least the first piezo assembly and/or the at least second piezo assembly, and wherein each of the recess of the plurality of recesses includes a first elevated plan and a second elevated plan in relative to a ground plane of the recess of the plurality of recesses on which the first piezo assembly or the at least second piezo assembly is arranged, and the first elevation plan and the second elevation plan provides the first connection and the second connection, respectively, and wherein the vibrator transfer unit is divided into two parts, an upper part having a first surface which includes another plurality of recesses that are similar to the plurality of recesses that is arranged in a first surface of the bottom part, and a second surface of the bottom part is configured to transfer the main vibration to the skull of the recipient.

16. A hearing aid according to claim 15, wherein the upper part and the bottom part are attached by applying the first surface of the upper part against the first surface of the bottom part, and the upper part is fixated to the bottom part by one or more screws.

17. A hearing aid configured to apply a main vibration onto a skull of a recipient of the hearing aid, and wherein the hearing aid includes a vibrator comprising:

a first assembly which comprises a magnet configured to provide a static magnetic flux and a coil configured to provide a dynamic magnetic flux based on a first current, and the coil is wrapped around at least a part of the magnet, a second assembly which includes a vibrator transfer unit and a suspension spring, and wherein the first assembly is configured to move relative to the second assembly generating a first vibration based on the static and the dynamic magnetic flux, and the first vibration is transferred to the vibrator transfer unit, a first piezo assembly configured to move based on a second current generating a second vibration, and wherein the first piezo assembly is connected to the vibrator transfer unit, and when the first piezo assembly moves a second vibration is generated, and the second vibration is transferred to the vibrator transfer unit, and wherein the main vibration is transferred to a skull of the recipient via the vibrator transfer unit, wherein the vibration includes the first vibration and/or the second vibration, wherein the first piezo assembly has at least a first end and a second end relative to a center of the first piezo assembly, and wherein the first piezo assembly has a first connection to the vibrator transfer unit arranged at the first end or between the first end and the center and a second connection to the vibrator transfer unit arranged at the second end or between the second end and the center, wherein the vibrator transfer unit includes a plurality of recesses configured to receive at least the first piezo assembly and/or the at least second piezo assembly, and wherein each of the recess of the plurality of recesses includes a first elevated plan and a second elevated plan in relative to a ground plane of the recess of the plurality of recesses on which the first piezo assembly or the at least second piezo assembly is arranged, and the first elevation plan and the second elevation plan provides the first connection and the second connection, respectively, and wherein the plurality of recesses is formed into one tapered recess wherein a distance between the first elevated plan and the second elevated plan of the tapered recess has different lengths along a horizontal axis configured to be about parallel to the skull of the recipient when wearing the hearing aid.

18. A hearing aid configured to apply a main vibration onto a skull of a recipient of the hearing aid, and wherein the hearing aid includes a vibrator comprising:

a first assembly which comprises a magnet configured to provide a static magnetic flux and a coil configured to provide a dynamic magnetic flux based on a first current, and the coil is wrapped around at least a part of the magnet, a second assembly which includes a vibrator transfer unit and a suspension spring, and wherein the first assembly is configured to move relative to the second assembly generating a first vibration based on the static and the dynamic magnetic flux, and the first vibration is transferred to the vibrator transfer unit, a first piezo assembly configured to move based on a second current generating a second vibration, and wherein the first piezo assembly is connected to the vibrator transfer unit, and when the first piezo assembly moves a second vibration is generated, and the second vibration is transferred to the vibrator transfer unit, and wherein the main vibration is transferred to a skull of the recipient via the vibrator transfer unit, wherein the vibration includes the first vibration and/or the second vibration, wherein the first piezo assembly is a sensor configured to monitor an output force of the second assembly provided by the main vibration which includes the first vibration, and wherein a processing unit is configured to determine whether the second current should be applied to the piezo assembly for boosting the main vibration based on a monitor signal provided by the sensor.

19. A hearing aid according to claim 18, wherein the processing unit is configured to set the first piezo assembly into a transducer mode configured to boost the main vibration or a sensor mode configured to monitor the output force of the second assembly.

* * * * *